United States Patent Office 2,736,060
Patented Feb. 28, 1956

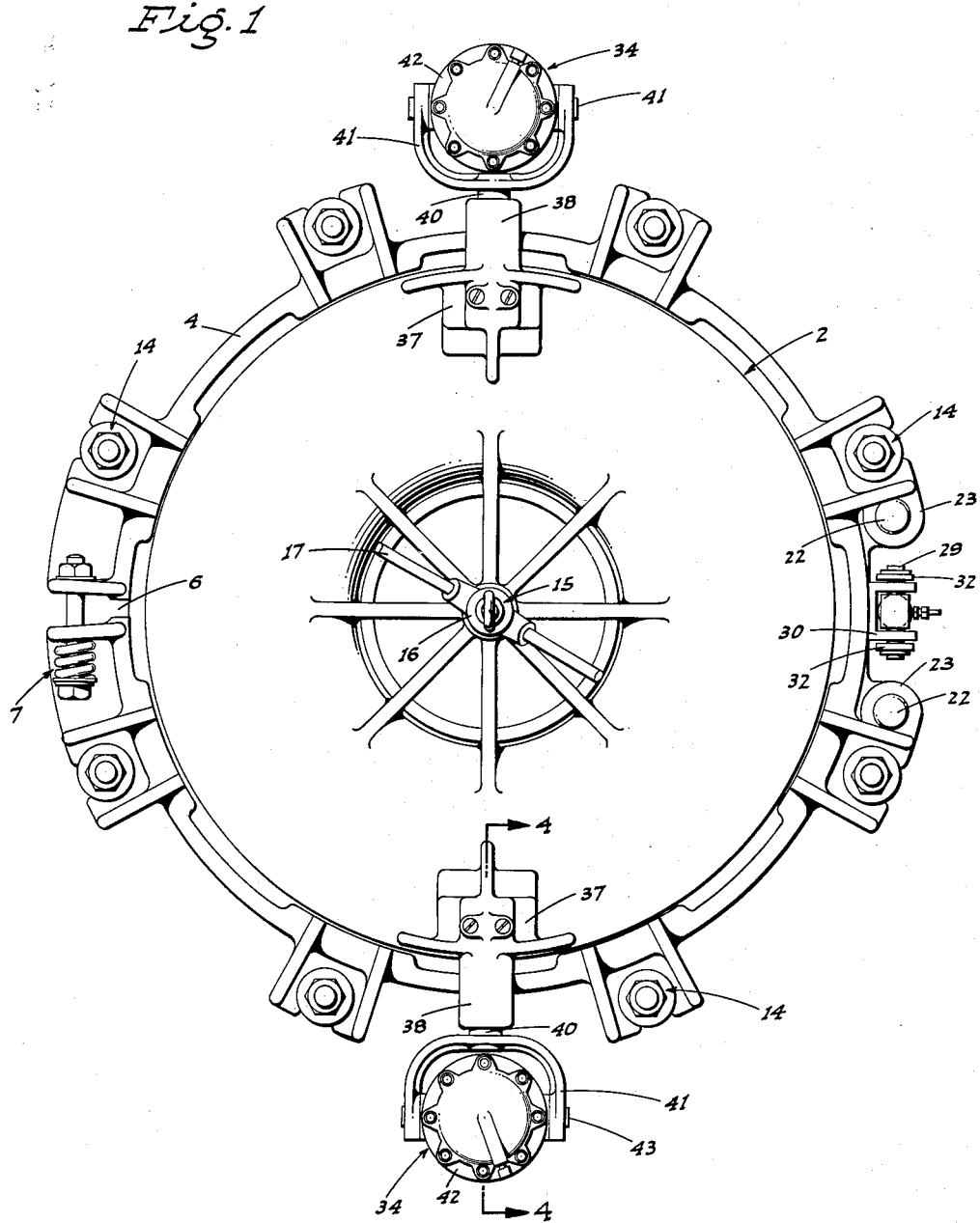

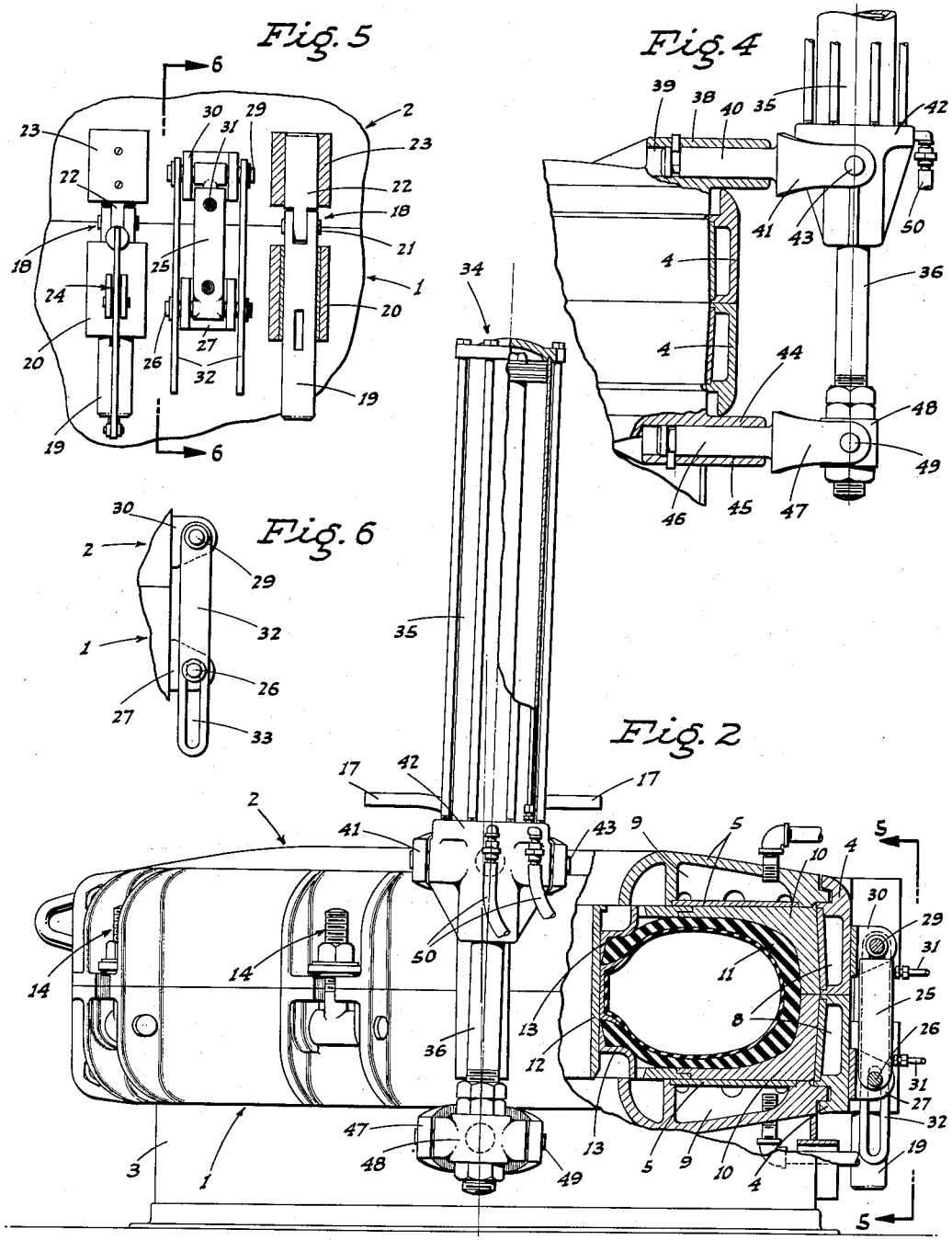

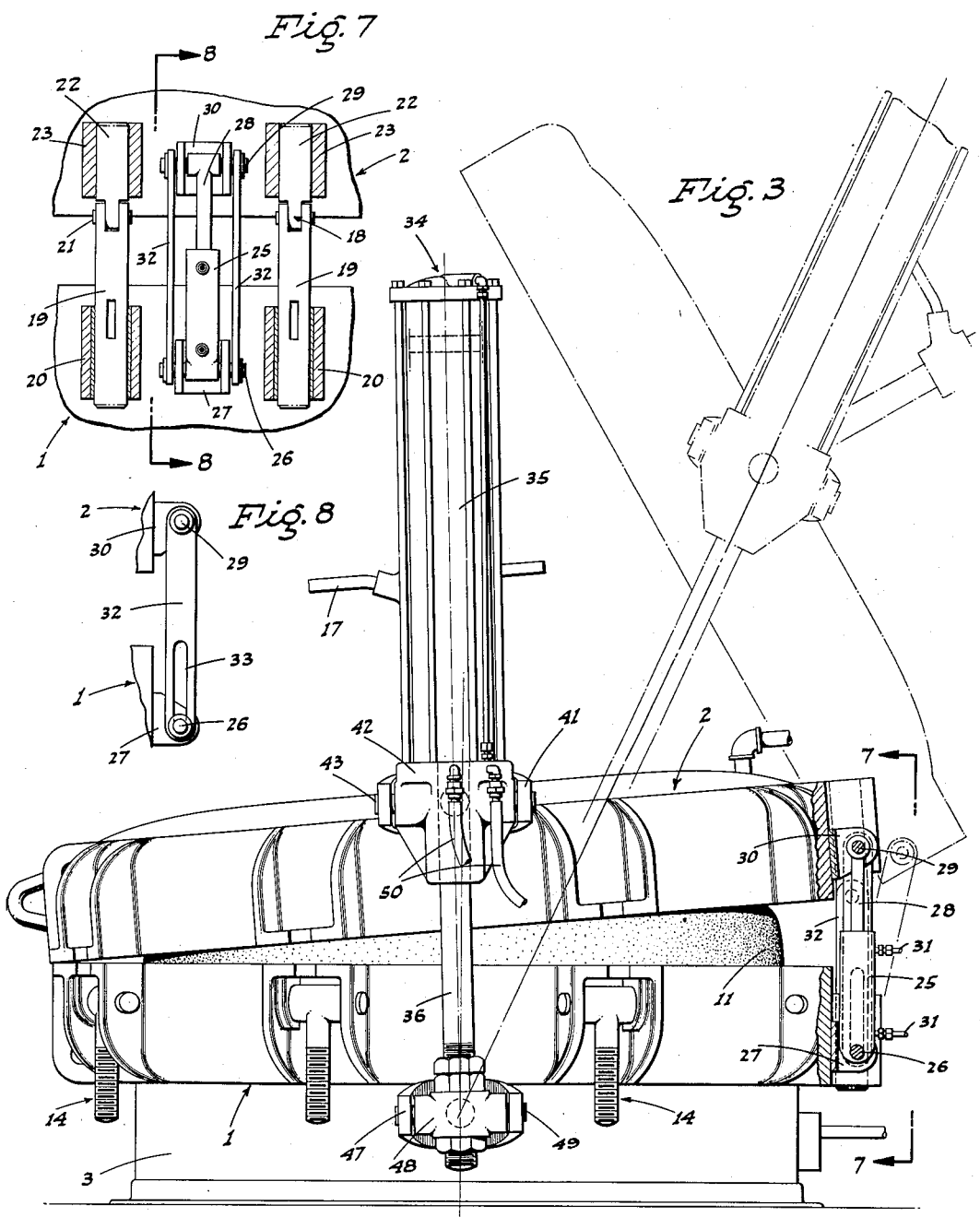

2,736,060
POWER MECHANISM FOR TIRE MOLDS

Edwin Allen Glynn, Lodi, Calif., assignor to Super Mold Corporation of California, Lodi, Calif., a corporation of California Application December 16, 1952, Serial No. 326,189

1 Claim. (Cl. 18—18)

The present invention relates in general to tire retreading or recapping molds, especially of the clamshell type which include a horizontally disposed fixed lower body section and a cooperating swingable upper body section hinged at the rear of the mold for movement between a gaped open position for tire placement in, or removal from, the mold, and a closed position with the body sections in engaged tire enclosing relation; the body sections being circular and having steam chambers therein in heating relation to the tire tread vulcanizing matrices carried in said sections.

This invention represents improvements over the control mechanism for tire molds as shown in United States Letters Patent No. 2,489,486.

The major object of the invention is to provide a novel power mechanism connected between the upper and lower body sections of the mold for the purpose of opening and closing the upper body section in a forceful and effective manner; it being understood that the mold, which is especially designed—but not limited—for use with truck or industrial tires, requires substantial power to open and close the same properly, and without undue time being required for the operation.

Another important object of the invention is to provide a power mechanism, for the above purpose, which includes a plurality of fluid pressure actuated power cylinders in novel combination with the body sections of the mold; there being one power cylinder between the body sections at the back of the mold to initially break the upper section free adjacent the hinge unit, the latter being vertically extensible, so as to partially gape the mold rearwardly; and a pair of power cylinders connected between the body sections at the sides of the mold to open the upper section so as to fully gape the mold forwardly, and to subsequently close said upper section. The sequential operation of the power cylinders, and the purpose for so gaping the mold, will appear hereinafter.

An additional object of the invention is to provide, in combination with the one power cylinder at the back of the mold, a novel device for limiting the extent of the throw of said one power cylinder.

A further object of the invention is to provide novel mounts between the power cylinders at the sides of the mold and the body sections; such mounts permitting of a universal motion, so that any slight cant or twist of the upper body section relative to the lower body section is not translated into an undesirable bind in the power cylinder structures; all whereby the power mechanism may function properly, smoothly, and without possible damage.

Still another object of the invention is to provide a practical and reliable power mechanism for tire molds, and one which will be exceedingly effective for the purpose for which it is designed.

These objects are accomplished by means of such structure and relative arrangement of parts as will fully appear by a perusal of the following specification and claim.

In the drawings:

Fig. 1 is a top plan of a tire mold embodying the present invention.

Fig. 2 is a side elevation of the mold closed, and showing the related positions of the parts.

Fig. 3 is a similar view, but shows, in full lines, the mold as initially partially gaped rearwardly, and, in broken lines, the mold as fully gaped forwardly.

Fig. 4 is a fragmentary elevation, partly in section, taken on line 4—4 of Fig. 1.

Fig. 5 is a fragmentary rear elevation, on line 5—5 of Fig. 2, showing the hinge units and the adjacent power cylinder; one hinge being in section.

Fig. 6 is a fragmentary side elevation taken on line 6—6 of Fig. 5, showing the means, as contracted, which limits the throw of the power cylinder shown in said figure.

Fig. 7 is a fragmentary side elevation taken on line 7—7 of Fig. 3, showing the hinge units and the adjacent power cylinder; both hinge units being in section.

Fig. 8 is a fragmentary side elevation taken on line 8—8 of Fig. 7, showing the stroke limiting means, for the adjacent power cylinder, as extended.

Referring now more particularly to the characters of reference on the drawings, the power mechanism, to which the present invention is directed, is embodied in a mold of the type which includes an annular, horizontally disposed lower body section, indicated generally at 1, and an annular upper body section, indicated generally at 2, which cooperates in matching relation with said lower body section 1; the latter being fixedly supported from the floor by a pedestal 3.

Each of the body sections is comprised of an annular body ring which carries an inwardly projecting side skirt; each such ring being indicated at 4 and the related side skirt at 5. As shown, the body rings 4 are split, as at 6, and clampingly engage the related side skirts 5; the clamping means being shown generally at 7.

The body rings 4 and side skirts 5 are formed internally with steam chambers, indicated at 8 and 9, respectively; such steam chambers serving to heat the annular matrix halves 10 with which the body sections 1 and 2 are fitted.

When the mold is closed in surrounding relation to a tire 11 disposed therein, the matrix halves 10 engage the tire tread in vulcanizing relation; such tread having been previously prepared for vulcanization by the affixation of new tread material or camelback.

The tire 11 as disposed in the mold is carried on a rim 12, with the tire beads engaging rim supported flanges 13; axial separation of the latter being prevented by their engagement with the related side skirts 5.

When the mold is closed, the body sections 1 and 2 are secured together by releasable bolt units 14, circumferentially spaced about the mold, and a releasable center tie bolt unit 15 which includes a tightening nut 16 having radiating handles 17. The center tie bolt unit is not here shown in detail, but is of the general type illustrated in United States Letters Patent No. 2,147,339.

At the back thereof the body sections 1 and 2 are connected together by a pair of adjacent but circumferentially spaced hinge units, each of which is indicated generally at 18. Each such hinge unit includes a vertical plunger 19 which slidably engages in a tubular guide 20 fixed to the lower body section 1. Above each guide 20 the related plunger 19 is connected by a transverse hinge pin 21 to an upwardly projecting stub rod 22 fixed in a tubular boss 23 secured to the upper body section 2.

The above described hinge units 18 are in effect vertically extensible, as the plungers 19 may slide upwardly in the guides 20 from lowered position; the purpose of such extension of the hinge units 18 being hereinafter described. Safety latch units, indicated at 24, are operative to releasably latch the plungers 19 in a predetermined raised position; such safety latch units 24 being here shown only generally, but described in greater detail with respect to structure in the above United States Letters Patent No. 2,489,486.

An upstanding, fluid pressure actuated power cylinder 25 is disposed between the hinge units 18, and such power cylinder 25 is pivoted by a transverse pivot pin 26 in a U-shaped attachment ear 27 on the lower body section 1. The piston rod 28 of power cylinder 25 projects upwardly and is pivoted by a pivot pin 29 in a U-shaped attachment ear 30 secured on the upper body section 2.

Fluid pressure is supplied to cylinder 25, as required, through conduits connected to said cylinder and indicated in part at 31; such cylinder 25 being of double-acting type.

In order to limit the throw of the power cylinder 25, the following arrangement is provided:

A pair of upstanding, transversely spaced links 32 are pivoted to the opposite ends of the pivot pin 29, and thence depend alongside the power cylinder 25 to adjacent the pivot pin 26; the latter working in elongated slots 33 in said links 32. The arrangement forms in effect a lost-motion connection, by means of which the throw of the power cylinder 25 is positively limited to a predetermined extent.

A pair of relatively large elongated fluid pressure actuated power cylinders 34 are disposed to the sides of the mold, with such cylinders inverted; i. e. with the main body 35 of the cylinders 34 projecting above the upper body section 2, and the piston rods 36 projecting downwardly alongside the lower body sections 1.

The body 35 of each power cylinder 34 is mounted in connection with the upper body section 2 as follows:

An attachment block 37 is fixed to the top of the upper body section 2, and includes a laterally outwardly projecting boss 38 formed with a bore 39 which carries a spindle 40 in turnable relation therein.

The spindle 40 is formed, at its outer end, with a yoke 41 which straddles the adjacent head 42 of the related power cylinder body 35, being pivoted to the latter as at 43.

With this arrangement each cylinder body 35 is in effect swivelly connected to the upper body section 2.

At the lower end thereof each piston rod 36 is similarly connected to the lower body section. This is accomplished by a boss 44 which projects laterally outwardly from each side of the lower body section in direct vertical alinement with the corresponding boss 38; each boss 44 having a bore 45 which carries a spindle 46 in turnable relation. The spindle 46 is formed, on its outer end, with a yoke 47 which straddles an attachment block 48 on the adjacent piston rod 36, being pivoted to the latter, as at 49.

The power cylinders 34 are double-acting and are operated to extend or contract the same by means of a valve-regulated, fluid pressure supply conduit system, shown in part at 50.

In operation of the described power mechanism—i. e. the back end power cylinder 25, and the side power cylinders 34—the same functions as follows:

With the mold closed with a tire 11 therein for vulcanization of the new tread material, the cylinders 25 and 34 are contracted, all standing vertical as in Fig. 2.

After the vulcanization is complete and it is desired to remove the tire 11 from the mold, the power cylinder 25 is actuated in a manner causing it to extend, which lifts the upper body section 2, gaping the mold at the rear in the manner shown in Fig. 3. This causes an initial breaking away of the upper body section 2 from the tire 11, and simultaneously causes an extension of the hinge units 18; the plungers 19 sliding upwardly in the guides 20 to a predetermined extent, whence the safety latch units 24 come into play, locking the plungers 19 in raised position so that the load is relieved from said power cylinder 25.

When the power cylinder 25 is extended for the above purpose, such extension is limited by the links 32.

The power cylinders 34 are then energized to cause them to extend, with the result that the upper body section 2 is swung upwardly and rearwardly about the hinge pins 21 as an axis, whereby to fully gape the mold forwardly; the full open position of the upper body section being shown in broken lines in Fig. 3. In this fully open position of the upper body section 1, the tire 11 is readily accessible for withdrawal from the mold; the latter remaining open for placement of the next tire in the mold for vulcanization.

After such next tire is placed in the lower body section 1, the upper body section 2 is swung downward, by reversal of the power cylinders 34, until said upper body section 2 is substantially parallel to the lower body section 1, but is disposed some distance thereabove by virtue of the vertical plungers 19 being latched in a raised position.

Thereafter, the safety latch units 24 are released and the power cylinders 25 and 34 operated simultaneously to contract the same in a manner to lower the then horizontal upper body section 2 downward into engagement with the lower body section 1, so as to complete the closing of the mold. After the mold is closed the body sections 1 and 2 are secured together by the releasable tie bolts 14 and the releasable center tie bolt unit 15.

With the described power mechanism, effective, forceful, and relatively rapid opening and closing of the upper body section—through the described sequence of movements—is attained in a facile manner; the operator of the mold being required only to properly manipulate the valves for the fluid pressure supply conduit systems, indicated in part at 31 and 50.

In the opening and closing movements of the upper body section 2, and due to one power cylinder 34 sometimes running slightly ahead of the other, there is a possibility of the section 2 canting one way or the other to a slight degree relative to the lower body section 1.

In order to prevent such canting from being translated to a binding motion on the power cylinders 34, the latter are each swivelly connected to the body sections 1 and 2 in the manner described; this being an important feature in the successful operation of the power mechanism.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

A power mechanism for a tire retreading mold which includes upper and lower body sections, and a transverse axis hinge unit connecting said body sections at the rear for relative opening and closing motion; said mechanism comprising a pair of upstanding fluid pressure actuated power cylinders disposed at the sides of the mold, and means including universal mounts pivotally connecting the power cylinders between said body sections; each mount comprising a tubular boss secured to and projecting laterally of the related body section, a spindle turnable in the boss, a yoke on the outer end of the spindle straddling an adjacent part of the related power cylinder, and means pivoting said part in the yoke at right angles to the spindle.

References Cited in the file of this patent

UNITED STATES PATENTS

| | | |
|---|---|---|
| 2,072,497 | DuPont | Mar. 2, 1937 |
| 2,200,871 | Bosomworth | May 14, 1940 |
| 2,231,254 | Cleveland | Feb. 11, 1941 |
| 2,489,486 | Glynn | Nov. 29, 1949 |
| 2,529,522 | Van Scoyk | Nov. 14, 1950 |